United States Patent
Sevindik

(10) Patent No.: US 9,894,669 B2
(45) Date of Patent: Feb. 13, 2018

(54) QUALITY OF SERVICE ENHANCEMENT FOR WIRELESS RELAY NETWORKS

(71) Applicant: Sprint Spectrum LP, Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 402 days.

(21) Appl. No.: 14/468,752

(22) Filed: Aug. 26, 2014

(65) Prior Publication Data

US 2016/0066336 A1    Mar. 3, 2016

(51) Int. Cl.
| | |
|---|---|
| H04J 1/00 | (2006.01) |
| H04W 72/10 | (2009.01) |
| H04B 7/14 | (2006.01) |
| H04B 7/26 | (2006.01) |
| H04L 12/851 | (2013.01) |
| H04W 40/22 | (2009.01) |
| H04L 1/00 | (2006.01) |

(52) U.S. Cl.
CPC .............. *H04W 72/10* (2013.01); *H04B 7/14* (2013.01); *H04B 7/2606* (2013.01); *H04L 47/24* (2013.01); *H04W 40/22* (2013.01); *H04L 47/2433* (2013.01); *H04L 2001/0097* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,799,047 B1 * | 9/2004 | Bahl | G01C 21/206 455/456.1 |
| 2001/0029187 A1 * | 10/2001 | Cannon | G08B 21/0247 455/462 |
| 2009/0061767 A1 * | 3/2009 | Horiuchi | H04B 7/155 455/18 |
| 2010/0022184 A1 | 1/2010 | Khoshnevis et al. | |
| 2010/0260129 A1 | 10/2010 | Ulupinar et al. | |
| 2012/0287851 A1 * | 11/2012 | Lee | H04W 48/02 370/328 |
| 2013/0336200 A1 | 12/2013 | Andreozzi et al. | |
| 2014/0126460 A1 * | 5/2014 | Bienas | H04W 74/002 370/315 |

FOREIGN PATENT DOCUMENTS

| | | |
|---|---|---|
| EP | 2109334 A2 | 10/2009 |
| WO | 2007064249 A1 | 6/2007 |

OTHER PUBLICATIONS

International Search Report for International Application No. PCT/US2015/046653, filed on Aug. 25, 2015.

* cited by examiner

*Primary Examiner* — Willie J Daniel, Jr.

(57) ABSTRACT

Multiple relays are different distances from their respective donor access nodes. The donor and relay path selected for a user's traffic is selected based on the priority associated with that user and a ratio of a channel quality indicator and the distance of the donor-relay link. Traffic associated with a higher priority user is routed via a path with a good channel quality indicator to distance ratio whereas traffic for other, lower QoS profile, users does not take channel quality or relay-to-donor distance into account.

17 Claims, 6 Drawing Sheets

QUALITY OF SERVICE ENHANCEMENT FOR WIRELESS RELAY NETWORKS

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Relay nodes can be provided in 4G networks to increase capacity and expand coverage area by facilitating communication between wireless devices and access nodes. For example, a relay access node can establish a backhaul link with a donor access node. The relay access node can establish access links with one or more wireless devices. This can improve the capacity and coverage in areas near to the relay access node—particularly when the relay access node is near the edge of the donor access node's coverage area.

OVERVIEW

In an embodiment, a first communication link is established between a donor access node and a first wireless device via a relay access node. The first wireless device is associated with a first service priority. A second communication link is established between the donor access node and a second wireless device. The second wireless device is associated with a second service priority. Based on the first wireless device being associated with the first service priority, and a distance between the donor access node and the relay access node, the donor access node is configured to schedule air-interface resources such that the first wireless device is assigned a higher priority than the second wireless device.

In an embodiment, a first communication link between a first donor access node and a first wireless device is established via a first relay access node. The first wireless device being associated with a first service priority. A first wireless link between the first donor access node and the first relay access node associated with a first plurality of signal quality indicators. Via a second relay access node, a second communication link between a second donor access node and the first wireless device is established. The second wireless link between the second donor access node and the second relay access node associated with a second plurality of signal quality indicators. A third communication link between the first donor access node and a second wireless device is established. The second wireless device being associated with a second service priority. Based on the first wireless device being associated with the first service priority, and at least one of the first plurality of signal quality indicators indicating a better signal quality than a corresponding at least one of the second plurality of signal quality indicators, the first donor access node is selected to communicate data to the first wireless device.

In an embodiment, a first communication link between a first donor access node and a first wireless device is established via a first relay access node. The first wireless device being associated with a first service priority. A first wireless link between the first donor access node and the first relay access node being associated with a first signal quality indicator. The first relay access node being a first distance from the first donor access node. Via a second relay access node, a second communication link between a second donor access node and the first wireless device is established. A second wireless link between the second donor access node and the second relay access node being associated with a second signal quality indicator. The second relay access node being a second distance from the second donor access node. A third communication link between the first donor access node and a second wireless device is established. The second wireless device associated with a second service priority. Based on the first wireless device being associated with the first service priority, the first distance, the first signal quality indicator, the second distance, and the second signal quality indicator, the first donor access node is selected to communicate data to the first wireless device.

DETAILED DESCRIPTION

In an embodiment, wireless devices in a network are associated with quality of service (QoS) profiles (e.g., "silver" or "gold") that help determine how their traffic is handled relative to each other. In other words, a "gold" user's traffic may be handled before (or faster) than a "silver," etc. user's traffic in order to provide a better experience to the gold user. To help improve the quality of experience seen by users with high QoS profiles, traffic destined for a high QoS profile wireless device via a relay access node is scheduled taking into account the distance the access node relay is from the donor access node. In other words, gold users are given a higher priority than other users when allocating air-interface resources being sent via a relay access node that is far from the donor access node. This helps improve the gold user's experience when compared to other users by compensating, at least partially, for RF transmission and relay access node delay.

In an embodiment, a high priority user may be able to communicate via multiple relays and donors. If these relays are the same distance from their respective donor access nodes, to help improve the quality of experience seen by users with high QoS profiles, the donor and relay path selected for the gold user's traffic is selected based on channel quality indicators of the donor-relay link. In other words, traffic associated with a gold user is routed via a path with good channel quality indicators whereas traffic for other users may not be routed via a path with the better quality channel.

In an embodiment, multiple relays are different distances from their respective donor access nodes, the donor and relay path selected for the gold user's traffic is selected based on a ratio of a channel quality indicator (or a power thereof) to the distance of the donor-relay link. In other words, traffic associated with a gold user is routed via a path with a good channel quality indicator to distance ratio whereas traffic for other, lower QoS profile, users does not take channel quality or relay-to-donor distance into account.

Figure 1:
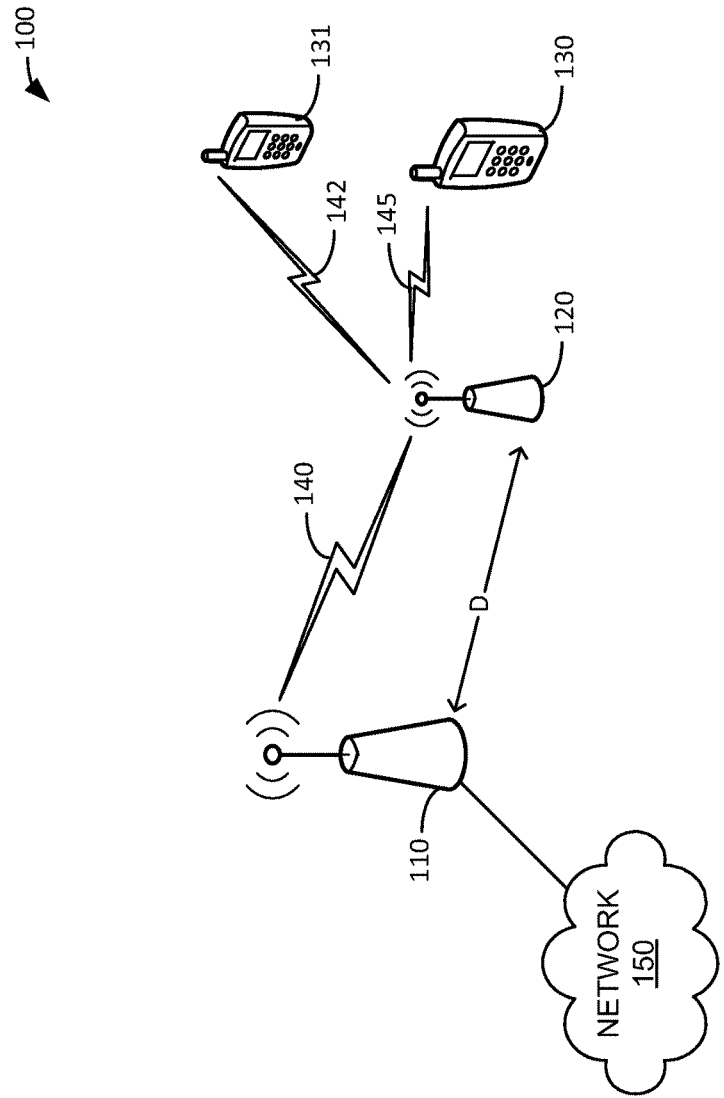
FIG. 1 is a block diagram illustrating a communication system.

FIG. 1 is a block diagram illustrating a communication system. In FIG. 1, communication system 100 comprises donor access node 110, relay access node 120, wireless device 130, wireless device 131, and network 150. Donor access node 110 is operatively coupled to relay access node 120 via wireless link 140. Relay access node 120 is operatively coupled to wireless device 130 via wireless link 145. Thus, wireless device 130 is operatively coupled to donor access node 110 via relay access node 120. Relay access node 120 is operatively coupled to wireless device 131 via wireless link 142. Thus, wireless device 131 is operatively coupled to donor access node 110 via relay access node 120. Donor access node 110 is illustrated as being a distance (D) from relay access node 120. Donor access node 110 is operatively coupled to network 150.

Wireless device 130 may be any device, system, combination of devices, or other such communication platform capable of communicating with donor access node 110 via relay access node 120 and wireless links 140 and 145. Wireless device 131 may be any device, system, combination of devices, or other such communication platform capable of communicating with access node 110 via relay access node 120 and wireless links 140 and 142. Each of wireless devices 130-131 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with donor access node 110 via wireless links. Other types of communication platforms are possible.

Donor access node 110 may be any wireless system that provides wireless service air interfaces to wireless devices 130-131, relay access node 120, and communication connectivity to network 150. Examples of access nodes that may be utilized include, base transceiver stations (BTSs), radio base stations (RBSs), Node B, enhanced Node B (eNBs) and others. Access nodes may include a number of elements known to those skilled in the art comprising a transceiver, power amplifier, combiner, duplexer, antenna and control function.

Network 150 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Network 150 may also comprise a wireless network, including base stations, wireless communication nodes, telephony switches, internet routers, network gateways, computer systems, communication links, or some other type of communication equipment, and combinations thereof.

Wired network protocols that may be utilized by network 150 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless communication links 140, 142, and 145 can be radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between donor access node 110 and network 150 which are omitted for clarity, including additional processing nodes, routers, gateways, and physical and/or wireless data links for carrying data among the various network elements.

In an embodiment, wireless device 130 may be associated with a first service priority (a.k.a., QoS profile.) Wireless device 131 may be associated with a second service priority. Other wireless devices (not shown) may be associated with other service priorities. For example, wireless device 131 may be associated with a low quality of service priority. In other words, communication system 100 may associate wireless device 130 with a quality of service priority (e.g., "gold") that is designed to differentiate wireless device 130 from other wireless devices (e.g., wireless device 131) associated with a lower quality of service priorities (e.g., "silver" or "bronze"). Based on this association, communication system 100 may undertake efforts to improve the quality of service provided to wireless devices (e.g., wireless device 130) associated with a higher quality of service priority at the expense of wireless devices associated with lower quality of service priorities (e.g., wireless device 131). The quality of service priority associated with wireless device 130 and/or wireless device 131 may be communicated to network 150 and base station 110.

In an embodiment, a communication link is established between donor access node 110 and wireless device 130.

This communication link uses relay access node 120 to relay transmissions between wireless device 130 and access node 110. In this embodiment, wireless link 140 and wireless links 145 and 142 use the same frequency band (i.e., inband relay.)

A communication link is also established between donor access node 110 and wireless device 131. This communication link uses relay access node 120 to relay transmissions between wireless device 131 and access node 110. Based on wireless device 130 being associated with the first (e.g., higher) QoS priority, and a distance between donor access node 110 and relay access node 120, donor access node 110 is configured to schedule air-interface resources such that wireless device 130 is assigned a higher priority than wireless device 131 (or other wireless devices using relay access node 120.)

In other words, because wireless device 130 has a higher QoS priority than wireless device 131, and if relay access node 120 is a relatively long distance from donor access node 110, donor access node 110 will give traffic communicated with wireless device 130 via relay access node 120 a higher scheduling priority than traffic communicated with wireless device 131 via relay access node 120. In this manner, some compensation for the RF transmission delays introduced by relay access node 120 (and the distance between relay access node 120 and donor access node 110, in particular) is given to higher priority devices (e.g., wireless device 130) and not given to lower priority devices (e.g., wireless device 131.)

Figure 2:
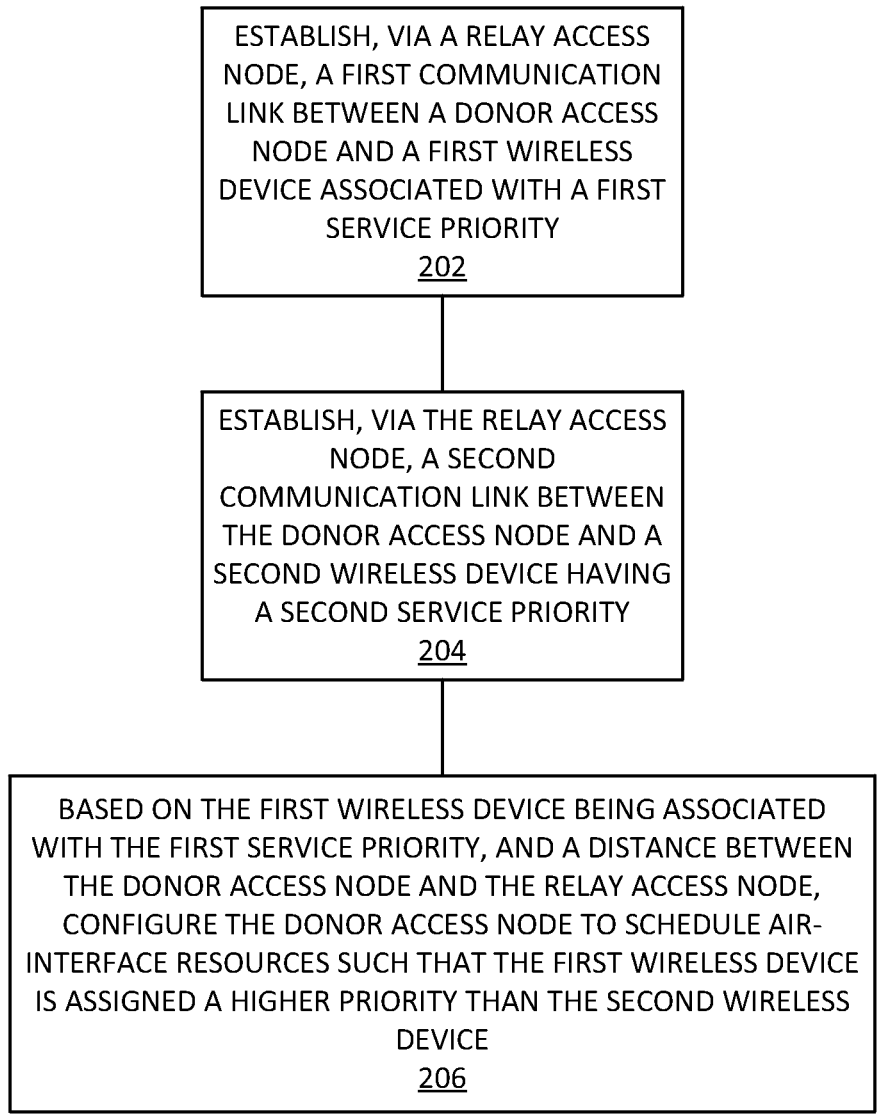
FIG. 2 is a flowchart illustrating a method of operating a communication system.

FIG. 2 is a flowchart illustrating a method of operating a communication system. The steps illustrated in FIG. 2 may be performed by one or more elements of communication system 100. A first communication link between a donor access node and a first wireless device associated with a first service priority is established via a relay access node (202). For example, a communication link between wireless device 130 and donor access node 110 may be established via relay access node 120, wireless link 140, and wireless link 145. Wireless device 130 may be associated with a quality of service priority (e.g., "gold") that is designed to differentiate wireless device 130 from other wireless devices (e.g., wireless device 131) associated with a lower quality of service priorities (e.g., "silver" or "bronze").

A second communication link between a donor access node and a second wireless device association with a second service priority is established via the relay access node (204). For example, a communication link between wireless device 131 and donor access node 110 may be established via relay access node 120, wireless link 140, and wireless link 142. Wireless device 130 may be associated with a quality of service priority (e.g., "silver") that is designed to differentiate wireless device 131 from other wireless devices (e.g., wireless device 131) associated with other quality of service priorities (e.g., "gold" or "bronze").

Based on the first wireless device being associated with the first service priority, and a distance between the donor access node and the relay access node, the donor access node is configured to schedule air-interface resources such that the first wireless device is assigned a higher priority than the second wireless device (206). For example, when the distance, D, between relay access node 120 and donor access node 110 exceeds a threshold criteria, traffic communicated with wireless device 130 may be scheduled with a higher priority than traffic communicated with wireless device 131. In this manner, some compensation for the RF transmission delays introduced by relay access node 120 (and the distance between relay access node 120 and donor access node 110, in particular) is given to wireless device 130 which has a higher priority and not given to wireless device 131 which has a lower priority. This helps differentiate the quality of service experienced by wireless device 130 from the quality of service experienced by wireless device 131—even though traffic for both wireless device 130 and 131 is relayed via relay access node 120.

Figure 3:
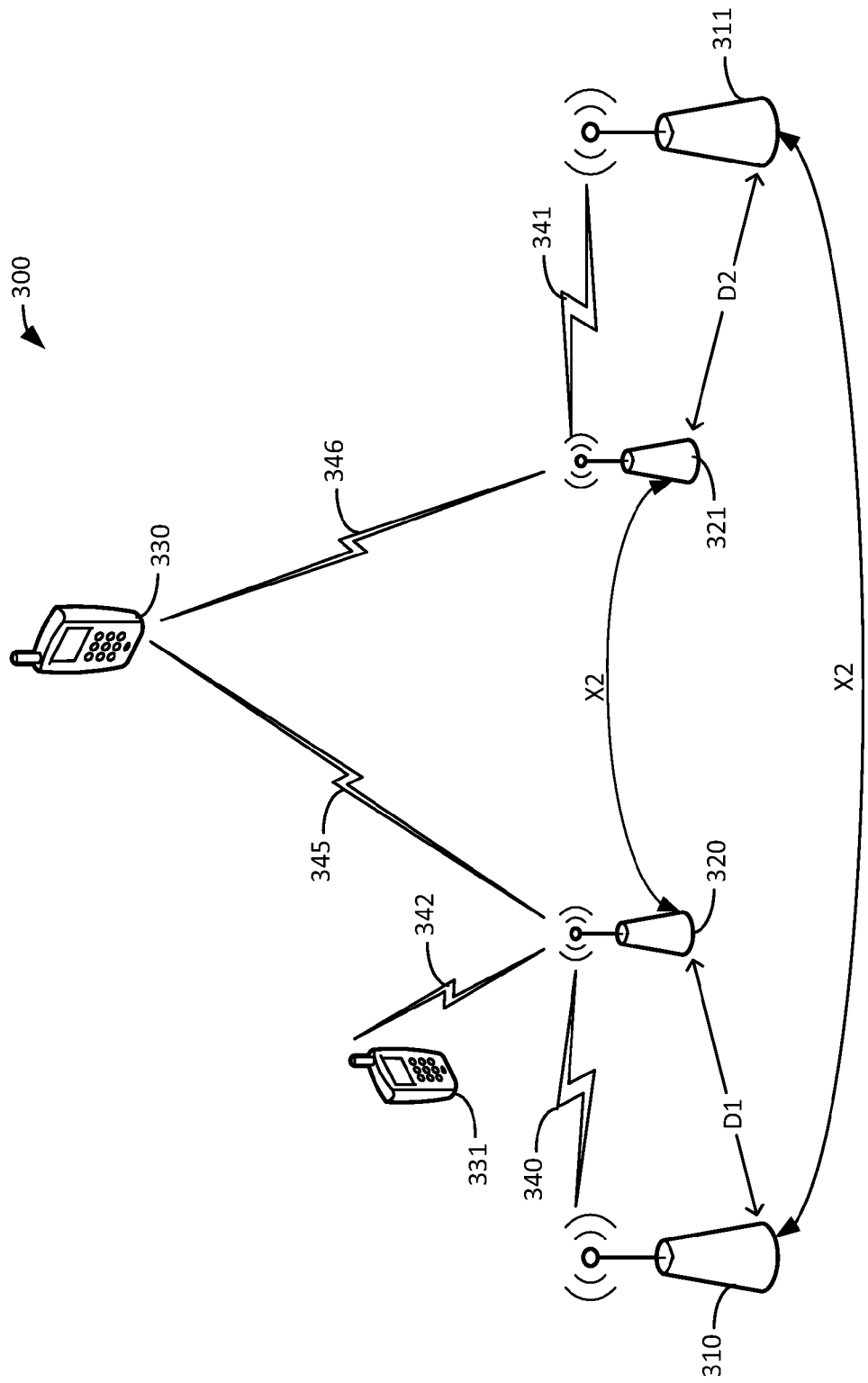
FIG. 3 is a block diagram illustrating a communication system.

FIG. 3 is a block diagram illustrating a communication system. In FIG. 3, communication system 300 comprises donor access node 310, donor access node 311, relay access node 320, relay access node 321, and wireless device 330. Donor access node 310 is operatively coupled to relay access node 320 via wireless link 340. Relay access node 320 is operatively coupled to wireless device 330 via wireless link 345. Thus, wireless device 330 is operatively coupled to donor access node 310 via relay access node 320. Relay access node 320 is also operatively coupled to wireless device 331 via wireless link 342. Thus, wireless device 331 is operatively coupled to donor access node 310 via relay access node 320. Donor access node 310 is illustrated as being a first distance (D1) from relay access node 320.

Donor access node 311 is operatively coupled to relay access node 321 via wireless link 341. Relay access node 321 is operatively coupled to wireless device 330 via wireless link 346. Thus, wireless device 330 is operatively coupled to donor access node 311 via relay access node 321. Donor access node 311 is illustrated as being a second distance (D2) from relay access node 321. Donor access node 310 is operatively coupled to donor access node 311. Donor access node 310 may be operatively coupled to donor access node 311 by a network. Donor access node 310 may be operatively coupled to donor access node 311 by a link using the X2 interface. Relay access node 320 is operatively coupled to relay access node 321. Relay access node 320 may be operatively coupled to relay access node 321 by a network. Relay access node 320 may be operatively coupled to relay access node 321 by a link using the X2 interface.

Wireless device 330 may be any device, system, combination of devices, or other such communication platform capable of communicating with donor access node 310 via relay access node 320 and wireless links 340 and 345 and also capable of communicating with donor access node 311 via relay access node 321 and wireless links 341 and 346. Wireless device 331 may be any device, system, combination of devices, or other such communication platform capable of communicating with donor access node 310 via relay access node 320 and wireless links 340 and 342. Wireless devices 330-331 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with donor access node 310 and donor access node 311 via wireless links. Other types of communication platforms are possible.

Donor access node 310 may be any wireless system that provides wireless service air interfaces to wireless devices 330, relay access node 320, and communication connectivity to a network. Donor access node 311 may be any wireless system that provides wireless service air interfaces to wireless devices 330, relay access node 321, and communication connectivity to the network. Examples of access nodes that may be utilized include, base transceiver stations (BTSs), radio base stations (RBSs), Node B, enhanced Node B (eNBs) and others. Access nodes may include a number of elements known to those skilled in the art comprising a transceiver, power amplifier, combiner, duplexer, antenna and control function.

Wireless communication links 340-341 and 345-346 can be radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between donor access node 310, donor access node 311, relay access node 320, relay access node 321, and a network which are omitted for clarity, including additional processing nodes, routers, gateways, and physical and/or wireless data links for carrying data among the various network elements.

In an embodiment, donor access node 310 and relay access node 320 are approximately the same distance apart as donor access node 311 is from relay access node 321. In other words, D1 and D2 are approximately equal (at least in terms of the transmission delay and signal strength of wireless link 340 and wireless link 341.) In addition, wireless device 330 may be associated with a first service priority (a.k.a., QoS profile.) Wireless device 331 may be associated with a second service priority. Other wireless devices (not shown) may be associated with other service priorities.

For example, wireless device 331 may be associated with a low quality of service priority. In other words, communication system 300 may associate wireless device 330 with a quality of service priority (e.g., "gold") that is designed to differentiate wireless device 330 from other wireless devices (e.g., wireless device 331) associated with a lower quality of service priorities (e.g., "silver" or "bronze"). Based on this association, communication system 300 may undertake efforts to improve the quality of service provided to wireless devices (e.g., wireless device 330) associated with higher quality of service priority at the expense of wireless devices associated with lower quality of service priorities (e.g., wireless device 331).

Communication system 300 establishes a communication link between donor access node 310 and wireless device 330. This communication link is established using relay access node 320. Communication system 300 also establishes a communication link between donor access node 311 and wireless device 330. This communication link is established using relay access node 321. A communication link between wireless device 331 and donor access node 310 is also established via relay access node 320.

In an embodiment, relay access node 320 and relay access node 321 function a layer 3 (L3) relays. In other words, relay access node 320 and relay access node 321 performs demodulation and decoding of the RF signals, processes received data, then encodes, modulates, and retransmits the data. In an embodiment, wireless link 340 and wireless link 345 use the same frequency band. In another embodiment, wireless link 340 and wireless link 345 use different frequency bands.

Wireless link 340 is associated with a number of signal quality indicators. Likewise, wireless link 341 is associated with corresponding number of signal quality indicators. These indicators can include an average channel quality indicator (CQI), a modulation and coding scheme (MCS), and/or a multiple-input multiple-output (MIMO) mode of operation. Based on one or more of these signal quality indicators, and the association between wireless device and the first service priority, communication system 300 selects one of wireless link 340 or wireless link 341 to communicate with wireless device 330.

In other words, because wireless device 330 is associated with a higher service priority than wireless device 331, communication system 300 takes the channel conditions of the donor-to-relay communication link into account when selecting which relay (e.g., relay access node 320 or relay access node 321) to use to communicate with wireless device 330. Because wireless device 331 is associated with a lower service priority, communication system 300 does not take the channel conditions of the donor-to-relay communication link into account when selecting which relay to use. This helps differentiate the quality of service experienced by wireless device 330 from the quality of service experienced by wireless device 331.

In an embodiment, communication system 300 selects relay access node 320 to communicate with wireless device 330 when the average CQI associated with wireless link 340 exceeds the average CQI associated with wireless link 341, the modulation and coding scheme being used by wireless link 340 exceeds (i.e., has a greater number of bits per symbol) the modulation and coding scheme being used by wireless link 341, and the MIMO antenna scheme used by wireless link 340 is greater than the MIMO antenna scheme used by wireless link 341. Donor access node 310 and donor access node 311 may exchange these signal quality indicators via an X2 interface. Relay access node 320 and relay access node 321 may exchange these signal quality indicators via an X2 interface.

In an embodiment, an average CQI may be calculated for the serving wireless link (e.g., wireless link 340 or wireless link 341) according to the following:

$$AvgCQI = \frac{\sum_{k=0}^{19} CQI(k)}{20}$$

where k=0 is the most recently reported CQI, k=1 is the next oldest, etc. In other words, when CQI reports are made every 1 mS, the average CQI used as a signal quality indicator can be the average of the CQI reports over the last 20 mS. In an embodiment, the last average CQI (i.e., the last AvgCQI that was calculated when that link was the serving link) may be used for the non-serving wireless link. In another embodiment, the last reported CQI (e.g., CQI(20)) plus some form of an averaging function may be used to calculate an average CQI for the non-serving wireless link.

In an embodiment, donor access node 310 and relay access node 320 is a different distance apart than donor access node 311 is from relay access node 321. In other words, D1 and D2 are not approximately equal (at least in terms of the transmission delay and signal strength of wireless link 340 and wireless link 341.) Based on the a signal quality indicator associated with wireless link 340, the distance between donor access node 310 and relay access node 320 (D1), a corresponding signal quality indicator associated with wireless link 341, and the distance between donor access node 311 and relay access node 321 (D2), communication system 330 selects one of wireless link 340 or wireless link 341 to communicate with wireless device 330.

In other words, because wireless device 330 is associated with a higher service priority than wireless device 331, communication system 300 takes the channel conditions of the donor-to-relay communication link, and the distance of that link, into account when selecting which relay (e.g., relay access node 120 or relay access node 121) to use to communicate with wireless device 330. Because wireless device 331 is associated with a lower service priority, communication system 300 does not take the channel conditions or the distance of the donor-to-relay communication link into account when selecting which relay to use. This helps differentiate the quality of service experienced by wireless device 330 from the quality of service experienced by wireless device 331.

In an embodiment, communication system 300 selects relay access node 320 to communicate with wireless device 330 when the ratio of the average CQI associated with wireless link 340 (optionally taken to a power) divided by the distance between donor access node 310 and relay access node 320 (D1) (i.e., $$R_{340} = \frac{(AvgCQI_{340})^x}{D1}$$

exceeds the average CQI associated with wireless link 341 (taken to the same power) divided by the distance between donor access node 311 and relay access node 321 (D2) (i.e., $$R_{341} = \frac{(AvgCQI_{341})^x}{D2}.$$

In other words, communication system 300 selects relay access node 320 to communicate with wireless device 330 when $R_{340} > R_{341}$.

Figure 4:
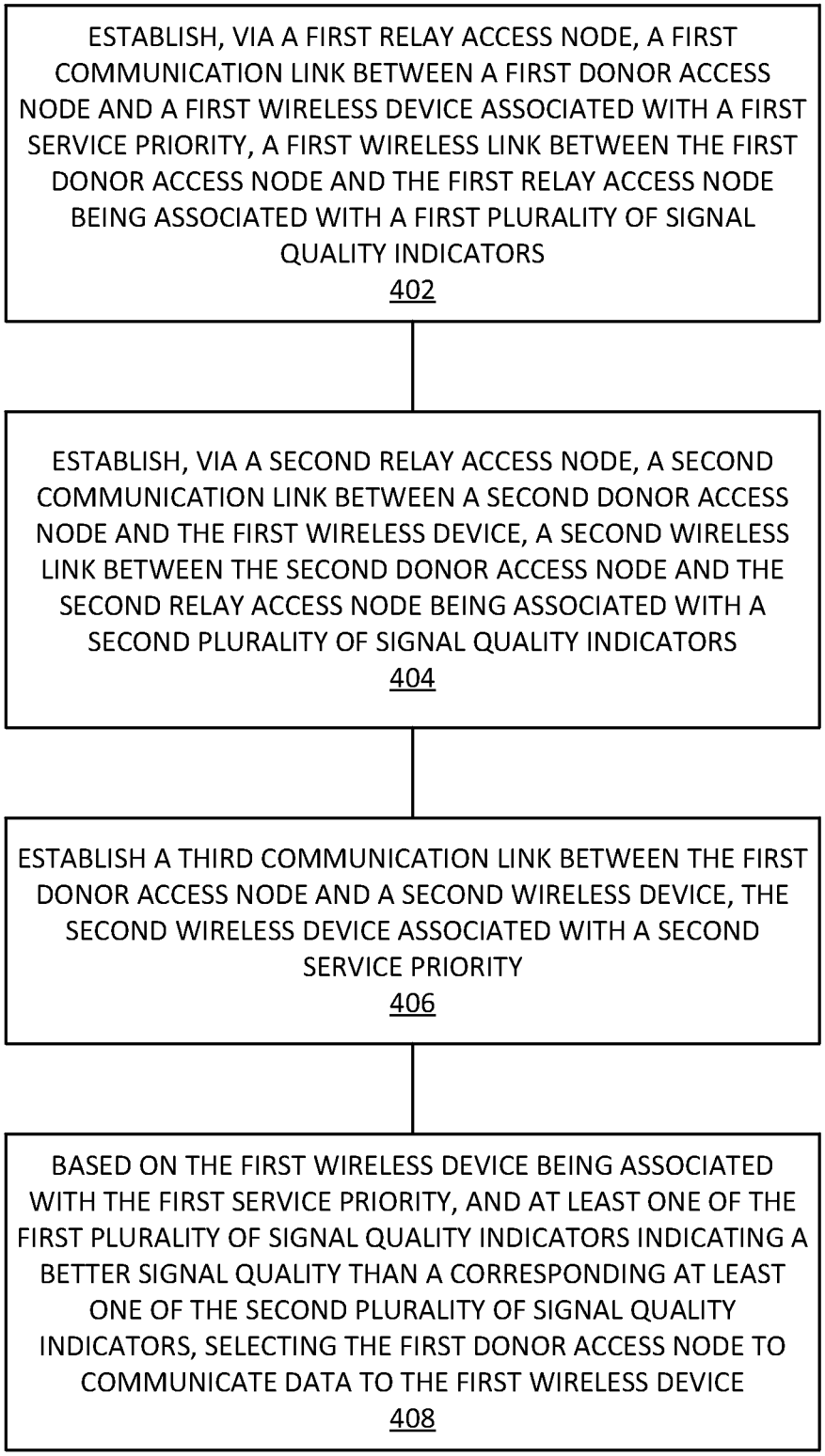
FIG. 4 is a flowchart of a method of providing quality of service levels in a communication system.

FIG. 4 is a flowchart of a method of providing quality of service levels in a communication system. The steps illustrated in FIG. 4 may be performed by one or more elements of communication system 300. Via a first relay access node, a first communication link between a first donor access node and a first wireless device associated with a first service priority is established. A first wireless link between the first donor access node and the first relay access node being associated with a first plurality of signal quality indicators (402). For example, a communication link between wireless device 330 and donor access node 310 can be established. This link can be established using relay access node 320 to relay communication using wireless link 340. Wireless link 340 may be associated with signal quality indicators such as average CQI, a MCS, and/or a MIMO scheme.

Via a second relay access node, a second communication link between a second donor access node and the first wireless device is established. A second wireless link between the second donor access node and the second relay access node being associated with a second plurality of signal quality indicators (404). For example, a communication link between wireless device 330 and donor access node 311 can be established. This link can be established using relay access node 321 to relay communication using wireless link 341. Wireless link 341 may be associated with signal quality indicators such as average CQI, a MCS, and/or a MIMO scheme.

A third communication link between the first donor access node and a second wireless device is established. The second wireless device being associated with a second service priority (406). For example, a communication link between wireless device 331 and donor access node 310 can be established using relay access node 320. Wireless device 331 may be associated with a lower quality of service profile than wireless device 330 is associated with.

Based on the first wireless device being associated with the first service priority, and at least one of the first plurality of signal quality indicators indicating a better signal quality than a corresponding at least one of the second plurality of signal quality indicator, the first donor access node is selected to communicate data to the first wireless device (408). For example, based on one or more of the average CQI, MCS, and/or MIMO scheme associated with wireless link 340 indicating better channel conditions than the corresponding one or more of the average CQI, MCS, and/or MIMO scheme associated with wireless link 341, communication system 300 may select donor access node 310 to communicate with wireless device 330. Communication system 300 does not take the average CQI, MCS, and/or MIMO scheme associated with wireless link 340 when selecting which donor access node is to be used to communicate with wireless device 331.

Figure 5:
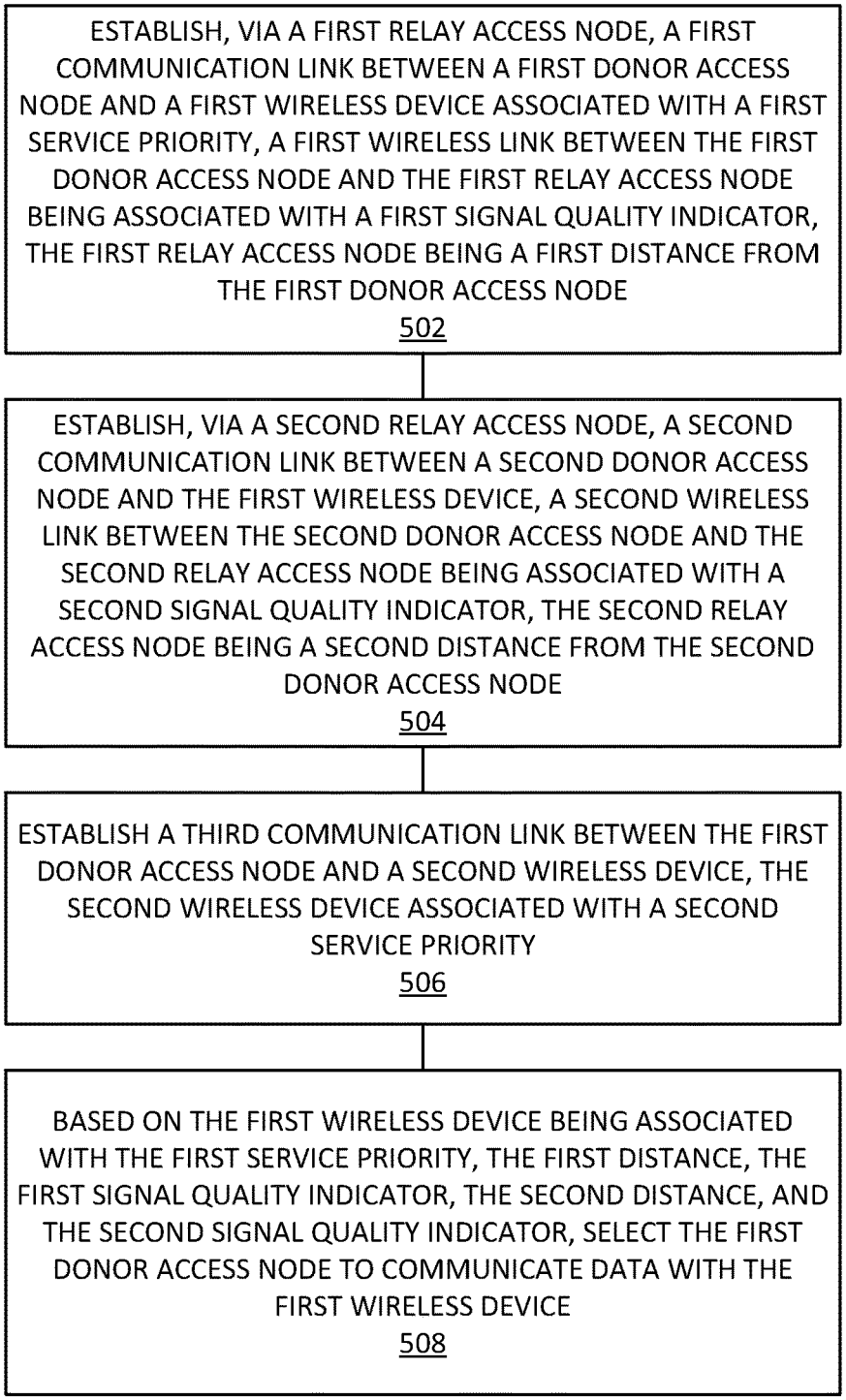
FIG. 5 is a flowchart of a method of providing quality of service levels based on relay distance.

FIG. 5 is a flowchart of a method of providing quality of service levels in a communication system. The steps illustrated in FIG. 5 may be performed by one or more elements of communication system 300. Via a first relay access node, a first communication link between a first donor access node and a first wireless device associated with a first service priority is established. A first wireless link between the first donor access node and the first relay access node being associated with a first signal quality indicator. The first relay access node being a first distance from the first donor access node (502). For example, a communication link between wireless device 330 and donor access node 310 can be established. This link can be established using relay access node 320 to relay communication using wireless link 340. Wireless link 340 may be associated with a signal quality indicator such as an average CQI. Donor access node 310 and relay access node 320 may be a first distance, D1, from each other.

Via a second relay access node, a second communication link between a second donor access node and the first wireless device is established. A second wireless link between the second donor access node and the second relay access node being associated with a second signal quality indicator. The second relay access node being a second distance from the second donor access node (504). For example, a communication link between wireless device 330 and donor access node 311 can be established. This link can be established using relay access node 321 to relay communication using wireless link 341. Wireless link 341 may be associated with a signal quality indicator such as an average CQI. Donor access node 311 and relay access node 321 may be a second distance, D2, from each other.

A third communication link between the first donor access node and a second wireless device is established. The second wireless device being associated with a second service priority (506). For example, a communication link between wireless device 331 and donor access node 310 can be established using relay access node 320. Wireless device 331 may be associated with a lower quality of service profile than wireless device 330 is associated with.

Based on the first wireless device being associated with the first service priority, the first distance, the first signal quality indicator, the second distance, and the second signal quality indicator, the first donor access node is selected to communicate data with the first wireless device (508). For example, the ratios of the first signal quality indicator divided by the first distance and the second signal quality indicator divided by the second distance may be used to determine which donor access node is to communicate with wireless device 330. In other words, whether $R_{340} > R_{341}$ may be used to select which of access node 310 and access node 311 is to be used to communicate with wireless device 330. Communication system 300 does not take $R_{340}$ or $R_{341}$ into account when selecting which donor access node is to be used to communicate with wireless device 331.

Figure 6:
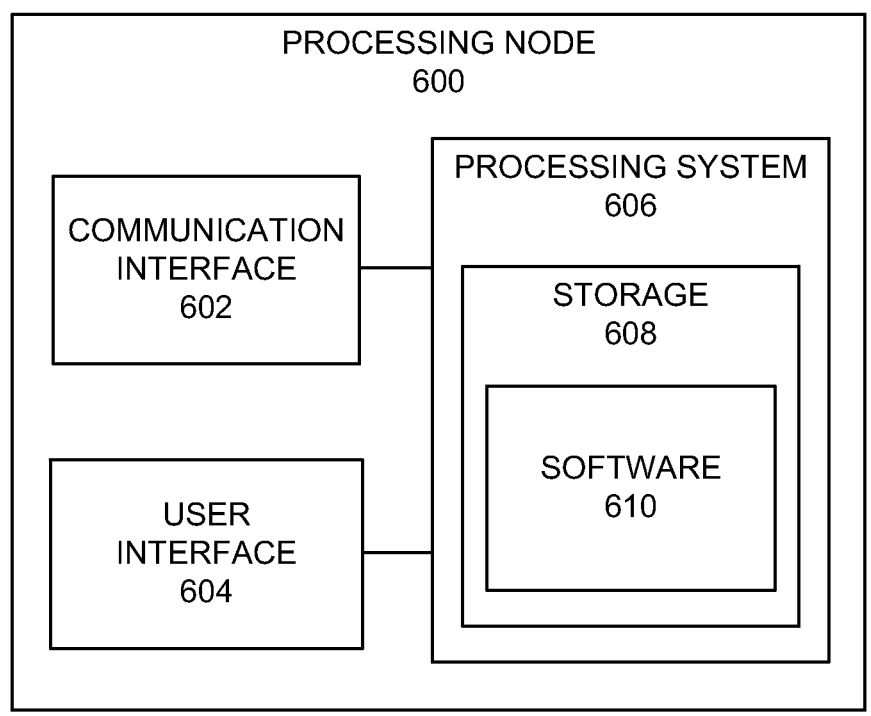
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include donor access node 110, donor access node 310, and donor access node 311. Processing node 600 can also be an adjunct or component of a network element, such as an element of access node 110, 120, 310, 311, 320, 321, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:
based on a first wireless device being associated with a first service priority, establishing, via a relay access node, a first communication link between a donor access node and a first wireless device, wherein the relay access node is selected for the first communication link based on a ratio of a first channel quality indicator of a first wireless communication link between the relay access node and the donor access node to a distance between the first relay access node and the donor access node; and
based on a second wireless device being associated with a second service priority that is lower than the first service priority, establishing, via the relay access node, a second communication link between the donor access node and the second wireless device without taking into consideration the first channel quality indicator and the distance between the relay access node and the donor access node.

2. The method of claim 1, wherein the distance meets a threshold criteria.

3. The method of claim 1, wherein the first communication link between the donor access node and the first wireless device includes the first wireless communication link between the donor access node and the relay access node and a second wireless communication link between the relay access node and the first wireless device.

4. The method of claim 3, wherein the first wireless communication link and the second wireless communication link use the same frequency band.

5. The method of claim 3, wherein the first wireless communication link and the second wireless communication link use different frequency bands.

6. The method of claim 1, further comprising:
determining an air-interface scheduling priority for the first wireless device that is based on the distance between the first wireless device and the relay access node.

7. The method of claim 6, further comprising:
scheduling a packet addressed to the first wireless device to be sent to the relay access node based on the air-interface scheduling priority of the first wireless device.

8. A method, comprising:
establishing, via a first relay access node, a first communication link between a first donor access node and a first wireless device, the first wireless device associated with a first service priority, a first wireless link between the first donor access node and the first relay access node being associated with a first plurality of signal quality indicators;
establishing, via a second relay access node, a second communication link between a second donor access node and the first wireless device, a second wireless link between the second donor access node and the second relay access node being associated with a second plurality of signal quality indicators;

establishing a third communication link between the first donor access node and a second wireless device, the second wireless device associated with a second service priority that is lower than the first service priority; and, selecting the first donor access node to communicate data with the first wireless device based on a ratio of at least one of the first plurality of signal quality indicators to a distance between the first donor access node and the first relay access node, wherein, based on the second service priority being lower than the first priority, the third communication link between the first donor access node and the second wireless device is established without taking into account the first and second signal quality indicators and the first and second distances.

9. The method of claim 8, wherein said first plurality of signal quality indicators and the second plurality of signal quality indicators include average channel quality indicators (CQI).

10. The method of claim 8, wherein said first plurality of signal quality indicators and the second plurality of signal quality indicators include modulation and coding scheme (MCS) indicators.

11. The method of claim 8, wherein said first plurality of signal quality indicators and the second plurality of signal quality indicators include indicators of a multiple-input and multiple-output antenna scheme being used.

12. The method of claim 8, wherein the selection of the first donor access node to communicate data to the first wireless device is communicated between the first donor access node and the second donor access node.

13. The method of claim 8, wherein a fourth wireless link between the first relay access node and the first wireless device and the first wireless link use the same frequency band.

14. The method of claim 8, wherein a fourth wireless link between the first relay access node and the first wireless device and the first wireless link use different frequency bands.

15. A method, comprising:
establishing, via a first relay access node, a first communication link between a first donor access node and a first wireless device, the first wireless device associated with a first service priority, a first wireless link between the first donor access node and the first relay access node being associated with a first signal quality indicator, the first relay access node being a first distance from the first donor access node;

establishing, via a second relay access node, a second communication link between a second donor access node and the first wireless device, a second wireless link between the second donor access node and the second relay access node being associated with a second signal quality indicator, the second relay access node being a second distance from the second donor access node;

establishing a third communication link between the first donor access node and a second wireless device, the second wireless device associated with a second service priority that is lower than the first service priority of the first wireless device; and, selecting the first donor access node to communicate data with the first wireless device based on a comparison of a first ratio of a power of the first signal quality indicator and the first distance and a second ratio of a power of the second signal quality indicator and the second distance, wherein, based on the second service priority being lower than the first priority, the third communication link between the first donor access node and the second wireless device is established without taking into account the first and second signal quality indicators and the first and second distances.

16. The method of claim 15, wherein the first quality indicator and the second signal quality indicator are average channel quality indicators (CQI).

17. The method of claim 16, wherein a fourth wireless link between the first relay access node and the first wireless device and the first wireless link use different frequency bands.

* * * * *